March 23, 1954

G. G. LIGHT ET AL 2,673,235

TELEGRAPH MESSAGE ALLOTTING SYSTEM

Filed May 23, 1951

3 Sheets-Sheet 1

INVENTORS
G. G. LIGHT
F. L. CURRIE

BY

W. R. Marsh
ATTORNEY

March 23, 1954 G. G. LIGHT ET AL 2,673,235

TELEGRAPH MESSAGE ALLOTTING SYSTEM

Filed May 23, 1951

3 Sheets-Sheet 2

BY

INVENTORS
G. G. LIGHT
F. L. CURRIE

M.R. Marsh
ATTORNEY

INVENTORS
G. G. LIGHT
F. L. CURRIE
BY
M. R. Marsh
ATTORNEY

Patented Mar. 23, 1954

2,673,235

UNITED STATES PATENT OFFICE 2,673,235

TELEGRAPH MESSAGE ALLOTTING SYSTEM

George G. Light, Scarsdale, N. Y., and Frank L. Currie, Plainfield, N. J., assignors to The Western Union Telegraph Company, New York, N. Y., a corporation of New York Application May 23, 1951, Serial No. 227,874

9 Claims. (Cl. 178—2)

This invention relates primarily to telegraph switching systems, and more particularly to a system, apparatus, and control circuits for determining and controlling the allocation of telegraph messages to two or more outgoing telegraph circuits or groups of circuits in accordance with a predetermined plan or ratio.

Telegraph messages originating in one country or area and destined for other countries or areas are normally turned over at so-called gateway cities to a number of different carriers in accordance with a predetermined ratio. For example, messages originating in this country and destined for Canada, which is served by two telegraph carriers, may have the messages proportioned between the two carriers in a definite ratio of, say, three to one, one carrier receiving one message for each three received by the other. In Canada, a particular destination may be served by only one of the carriers and messages destined to such are herein classified as exclusive messages and accordingly must be handled exclusively by the single carrier serving that destination. Also, messages that contain specific routing instructions as to which carrier should handle the same are classified as exclusive messages. Some destinations in Canada are served by both carriers and therefore may be handled by either of the carriers. Such messages are herein classified as nonexclusive messages and obviously it is only through the appropriate switching of the nonexclusive messages that the definite desired ratio of, say, three to one, between the two carriers can be maintained.

In accordance with the invention, a so-called quota ratio indicator is provided with an individual lamp for each of the carriers to which messages may be turned over at gateway cities. In the assumed case of a gateway city to Canada there will be two lamps and one or the other of these lamps will be lighted at all times to indicate to the attendant which of the two carriers is to handle the next nonexclusive message destined for Canada. As each message is switched to Canada, either an exclusive or a nonexclusive message, it is registered by the quota ratio indicator and it functions to control the two switching instruction lamps in such a manner as to maintain the desired ratio of messages switched to the two carriers.

One of the primary objects of the present invention is to provide an indicating arrangement for use in conjunction with a telegraph system at a gateway or exchange point, for example, to indicate to which one of a plurality of carriers a message should be given in order to maintain a predetermined ratio of messages between the carriers.

Another object of the present invention is to provide an arrangement of the above type which normally takes into account in the ratio determination the messages given to a certain carrier because it is the only one serving a particular destination or has instructions for handling by a specified carrier even though the indicating arrangement indicates that the message should be handled by another carrier.

Another object of the present invention is to provide an indicator of the above type with means to prevent certain classes of messages, such as supervisory notes, etc., handed or turned over to the various carriers, from entering into the ratio determination.

Still another object of the invention is to provide an improved arrangement for operating a rotary switch such as the connector switch employed herein for connecting the transmitter of a receiving position to a sending position.

The above and further objects of the invention will be more apparent in the following detailed description of an illustrative embodiment thereof wherein reference is made to the accompanying drawings. In the drawings.

The invention is shown and described herein as being applied to a telegraph switching system wherein telegraph messages received at a switching point, such as a gateway city, are directed or switched to one or the other of two other carriers in accordance with a predetermined ratio, with an indicator adapted for indicating to which carrier each message should be given in order to maintain the prescribed ratio. It will be obvious that the principles of the invention could be applied to various other situations and it is not limited to the specific embodiment described. For example, the principles of the invention could be applied to a situation where it was desired to divide outgoing messages among a number of circuits in a predetermined ratio.

Figure 1:
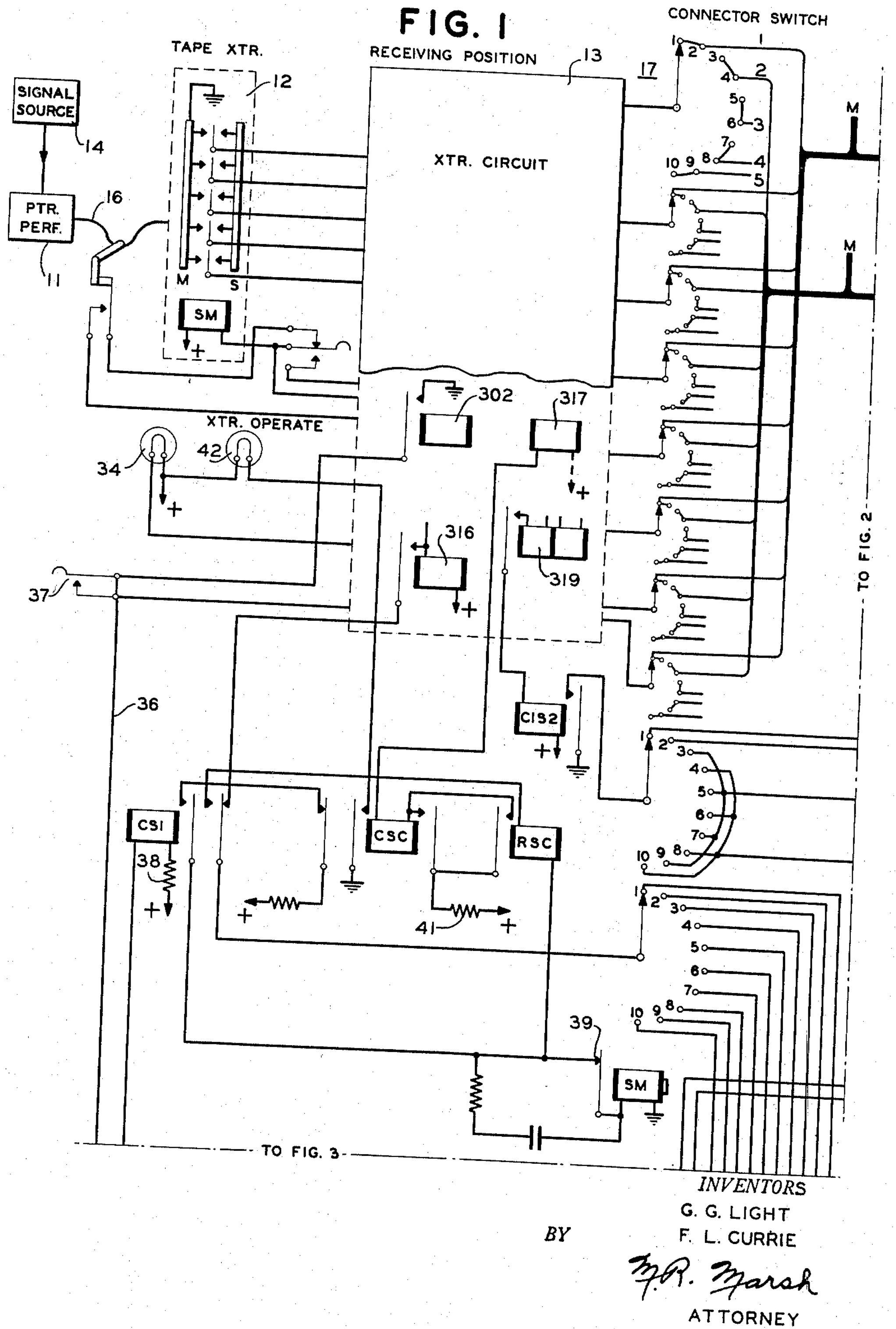
Fig. 1 shows primarily the equipment and some of the circuits of a receiving position.

In accordance with the principles of the invention, messages are received at a receiving position comprising mainly the equipment shown in Fig. 1. The main items of equipment at a receiving position consist of a printer perforator 11, a tape transmitter 12, and a transmitter circuit 13. Signals from a source such as 14, which may be a remote office or a transmitter at the switching center, or some other suitable source, operate the reperforator to store message signals in a perforated tape 16. The tape 16 controls the tape transmitter 12 to transmit the stored signals to a sending position in a manner hereinafter set forth. The operation of the tape transmitter is controlled by the transmitter circuit 13 which contains a number of relays and may be similar to the transmitter circuit shown in either Figs. 2 and 3 of U. S. Patent 2,546,627, March 27, 1951, W. B. Blanton et al., or Figs. 2 and 3 of U. S. Patent 2,546,630, March 27, 1951, F. L. Currie et al. The relays shown in the transmitter circuit of Fig. 1 are indicated by reference numerals corresponding to the reference numerals employed in Patent 2,546,630 and have similar functions.

The principal functions of the transmitter circuit, as fully set forth in the above-mentioned patents, is to control the tape transmitter 12 to idle blank tape therethrough, stop the transmitter when the first perforated character in the tape reaches the sensing pins, light the message waiting lamp, establish a potential connection between the transmitter circuit and a sending position, and various other subsidiary functions.

Figure 2:
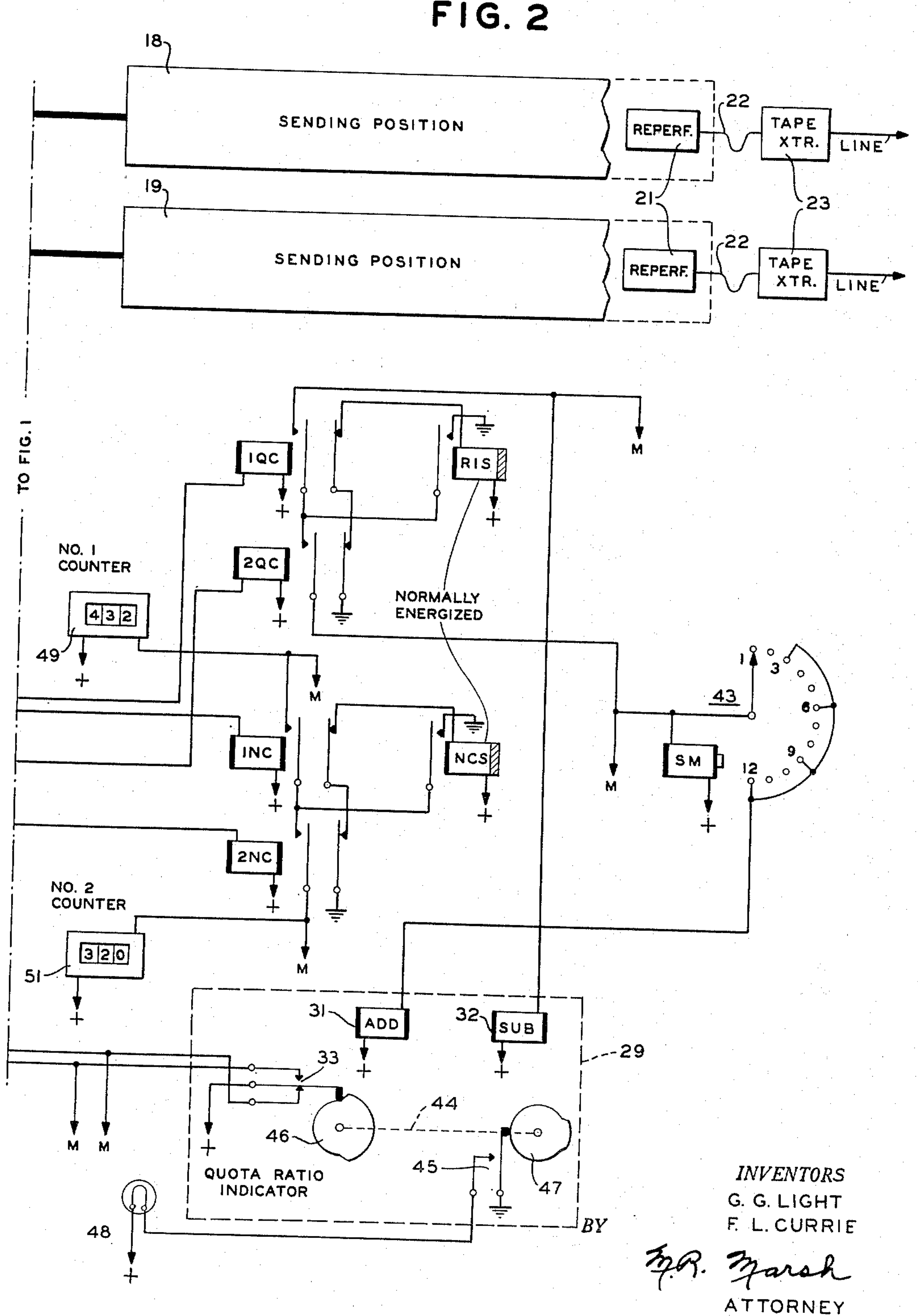
Fig. 2 shows primarily a plurality of sending positions and some of the control circuits.
Figure 3:
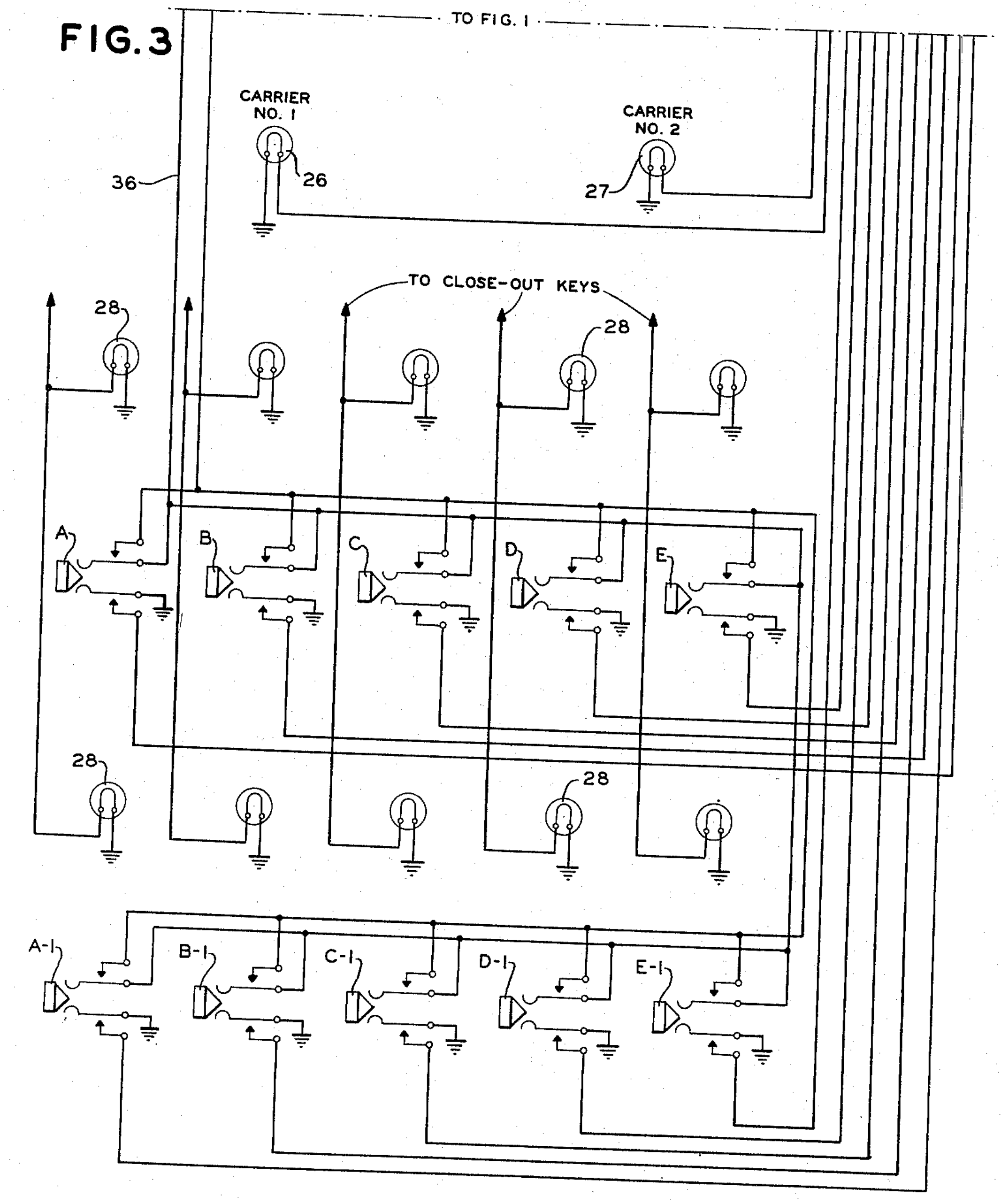
Fig. 3 shows some of the control circuits for establishing transmission paths between the receiving position and the sending positions.
Figure 4:
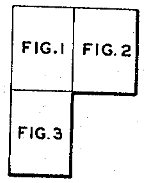
Fig. 4 shows the manner in which Figs. 1 to 3 may be arranged with respect to one another to form a complete circuit arrangement.

Associated with the transmitter circuit is a connector switch 17, a multilevel rotary switch for extending a number of individual circuits from the receiving position to any one of a plurality of sending positions. In Fig. 2, two sending positions are indicated by reference numerals 18 and 19, each having a reperforator 21 for storing message signals in associated tapes 22 adapted to control transmitters 23. The transmitters 23 transmit the signals stored in the tapes 22 to sending lines L. The detail circuits of a sending position are shown in Figs. 20 and 21, and 21 and 22, of the above-mentioned Patents 2,546,627 and 2,546,630, respectively. The main purpose of the sending positions is to receive signals from a receiving position and store the same in perforated tapes 22. The sending positions 18, 19 are connected to various points on the several levels of the connector switch 17 and are multiplied to the connector switches associated with the other receiving positions in the switching center. The multiple connections are indicated by the reference character M and it will be understood that the number of receiving positions can be any number required to meet the demands of the system.

Associated with each receiving position is a push button turret comprising a plurality of push buttons and associated signal lamps, together with a pair of other lamps 26 and 27. The push buttons are preferably arranged in two horizontal rows and in Fig. 3 the upper row is identified by the letters A, B, C, D and E, and the lower row by A–1, B–1, C–1, D–1 and E–1. The push buttons control the operation of the connector switch 17 to connect the transmitter circuit 13 of the receiving posiion to any one of five sending positions in the arrangement shown and by the employment of more push buttons, more sending positions could be utilized. The signal lamps 28 associated with each push button are close-out lamps and indicate to the attendant when the associated sending position is closed out for one reason or another, such as being temporarily out of service or closed for the remainder of the day.

Also shown in Fig. 2 is a piece of equipment identified by reference numeral 29, called a quota ratio indicator, having an Add magnet 31 and a Subtract magnet 32. The operation of this piece of equipment will be described in greater detail hereinafter and it may be similar in some respects to the Message Waiting indicator identified by reference numeral 8, Fig. 3, of the copending application of W. B. Blanton et al., Ser. No. 108,208 filed August 2, 1949 now U. S. Patent No. 2,575,239 dated November 20, 1951, and entitled "Telegraph Switching System."

The quota ratio indicator 29 controls the illumination of lamps 26 and 27 to indicate which one of the carriers is to receive the next nonexclusive message. With lamp 27 illuminated, the attendant is informed that carrier No. 2 is to receive the next nonexclusive message, and with lamp 26 illuminated, carrier No. 1 is to receive the next nonexclusive message. Either one or the other of the lamps 26 and 27 is always illuminated.

In the arrangement of the invention shown in the drawing, it is assumed that keys A and A–1 are assigned to one of the two carrier such as the No. 1, and the remaining keys B to E and B–1 to E–1 are assigned to the No. 2 carrier. It is further assumed that the A and B keys represent the same destination which is served by both carriers, and the key C to E represent destinations served only by the No. 2 carrier. The A–1 and B–1 keys represent the same destination served by both carriers, and the C–1 and E–1 keys represent those served only by the No. 2 carrier.

It will now be assumed that the quota radio indicator is in its zero position, as shown in the drawings, and in this position completes a circuit from battery applied to the movable element of contacts 33 to the lamp 27 of the No. 2 carrier so as to indicate that the next nonexclusive message is to be switched to the No. 2 carrier. It will further be assumed that a message is subsequently stored in the tape 16 of the receiving position and that the transmitter circuit 13 controls the advancement of the blank tape through the transmitter 12 until the first message character is over the pins of the transmitter. This results in the operation of relay 302 and the illumination of the Message Waiting lamp 34. If this message in the tape 16 is a nonexclusive message and intended for the destination represented by the A and B push buttons of both carriers, the attendant after determining the destination and noting that lamp 27 is lighted, will press push button B. Pressing this button completes a circuit from potential through the coil of relay CSI, the upper springs of the button, conductor 36, a tongue and front contact of relay 302, to ground. The conductor 36 is connected across the terminals of the transmitter initiate key 37 normally employed in the transmitter circuit of the above-mentioned patents. Relay CSI is operated by the above circuit which includes a resistance 38 in the battery connection. Operation of push button B through its lower contact applies a ground to the third point on the lower level of the connector switch 17 and thereby marks this point.

As relay CSI operates, it establishes two parallel circuits. One of these circuits is from potential through the outer tongue and back contact of relay CSC, the front contact and inner tongue of relay CSI, and the self-interrupting contacts 39 and coil of the step magnet SM of the connector switch 17 to ground. The other circuit extends through the coil of relay RSC, which is of low resistance, and the front contact and outer tongue of relay CSI to the wiper of the lower level of the connector switch 17. If the lower wiper of the connector switch 17 should happen to be on the marked point, or the third point in this case, the low resistance of the coil of relay RSC will short-circuit the coil of the step magnet SM to prevent the connector switch from advancing. On the other hand, if the connector switch is not on the marked or grounded point, it will self-step until the wipers reach this point, whereupon the coil of relay RSC will short-circuit the step magnet to cause the wipers to remain at this point. The operation of relay RSC in its short-circuiting function indicates that the connector switch was resting on its marked point or that it has self-stepped the wipers to the marked point.

As relay RSC operates, it completes a circuit for the operation of relay 317 in the transmitter circuit and relay CSC which lock up through a circuit including a resistance 41 and a front contact of relay CSC. The operation of relay CSC through its outer left hand tongue removes potential from the circuit to the connector switch step magnet SM and the coil of relay RSC. The operation of relay CSC through its inner left hand tongue also completes a circuit for the operation of the transmitter operate lamp 42.

A potential connection has at this time been established from the receiving position through the connector switch 17 to the sending position 19 assigned to or representing the destination of the B push button of the No. 2 carrier, and in conjunction therewith the initial seize relay 319 of the transmitter circuit operates from the allotter pulse whereupon it locks up in series with the winding of relay CIS2. The transmitter circuit 13 then controls the transmitter 12 to cause the message stored in the tape 16 to be transmitted intraoffice to the sending position, which in this case is sending position 19, where the message is again stored in the tape 22 and subsequently transmitted to the line L. The above-mentioned patents fully describe the intraoffice transmission of a message and at the end thereof the end-of-message signal breaks down the intraoffice path and releases the sending position for seizure by other receiving positions having messages to transmit thereto.

Relay CIS2, energized in conjunction with the establishment of the intraoffice transmission path, is employed to actuate the quota ratio indicator 29 and its operation applies a ground to the wiper of the next to the lowermost level of the connector switch 17. With this wiper resting on its third point under the assumed conditions a circuit is completed for the operation of relay 2QC or the quota count relay of carrier No. 2. As relay 2QC operates, its outer tongue removes ground from the circuit normally holding slow-to-release relay RIS operated. But before the release of this relay, the inner tongue of relay 2QC completes a circuit to ground through the tongue of relay RIS and through the step magnet SM of a rotary switch 43 to energize the same. Subsequent release of relay RIS interrupts the circuit to the step magnet SM whereupon the wiper of the rotary switch is advanced from its first to its second point. The advancement of rotary switch 43 one step registers that one message has been switched to the No. 2 carrier. If it is assumed that the next message stored in the tape is an exclusive message, or one served only by the No. 2 carrier and represented by the C push button, the operator will, after determining the destination, depress the C push button. This will cause the connector switch 17 to advance the wipers to the No. 5 points thereof. In conjunction therewith the above-mentioned relays will operate and cause the message to be transmitted intraoffice to the appropriate sending position and again cause operation of relay 2QC. As before, the operation of this relay will energize the stepping magnet of rotary switch 43 causing it to take another step and thereby register two messages as having been switched to the No. 2 carrier. At this time the wiper of rotary switch 43 will be on its third point. Also the position of the quota ratio indicator has not been changed and the No. 2 carrier lamp 27 will still be lighted to indicate that the next nonexclusive message should be switched to the No. 2 carrier. If this next message is a nonexclusive message with a destination served by both carriers, such as that represented by push buttons A and B, the operation of push button B causes the energization of the quota count relay 2QC a third time. This in turn completes a circuit to the step magnet SM of rotary switch 43 and through a parallel circuit including the wiper and third point of switch 43 to the Add magnet 31 of the quota ratio indicator 29. The parallel circuits are opened when relay RIS is subsequently operated. The release of step magnet SM of rotary switch 43 advances the wiper to its fourth point and in conjunction with the energization of Add magnet 31 the shaft 44 and its attached cams 46 and 47 is stepped in a counterclockwise direction one step. This operation of cam 46 moves the center arm of contacts 33 to interrupt the circuit to lamp 27 and complete a circuit to lamp 26. Thus the attendant is advised by the illumination of the No. 1 carrier lamp 26 that the next nonexclusive message should be switched to this carrier.

If the next message is a nonexclusive one intended for a destination represented by both the A and B push buttons, the operator will actuate push button A, since the lamp 26 is lighted, which grounds the No. 1 point of the lower level of connector switch 17. The wipers of the switch 17 are advanced, as above set forth and subsequently when they reach the No. 1 points, a circuit from ground is completed through the contacts of relay CIS2, the next to last wiper of rotary switch 17 and the No. 1 point thereof, and the coil of relay 1QC, or carrier No. 1 quota count relay, to potential, thereby causing relay 1QC to operate. The operation of relay 1QC through its outer tongue interrupts the circuit to slow-to-release relay RIS and through its inner tongue applies ground through the coil of the subtract magnet 32 to potential causing it to operate. The subsequent release of relay RIS interrupts the above circuit whereby the magnet 32 steps the shaft 44 one step in a clockwise direction. The quota ratio indicator is thus restored to its zero position, resulting in the lamp 26 being extinguished and the lamp 27 being lighted. This indicates that the next nonexclusive message is to be switched to the No. 2 carrier.

From the above it will be evident that the quota ratio indicator 29 controls the lighting of lamps 26 and 27 in such a manner as to maintain a ratio of three messages switched to carrier No. 2 for each message switched to carrier No. 1. Also, that even when a number of exclusive messages are switched successively, to one carrier, such as for example, carrier No. 1, while the lamp 27 of carrier No. 2 is lighted, the quota ratio indicator will maintain an accurate count of these messages and will continue to keep the lamp 27 lighted until a sufficient number of messages have been switched to carrier No. 2 to restore the three to one ratio. The cam 47 in the quota ratio indicator is arranged to operate contacts 45 to illuminate lamp 48 should the ratio be unbalanced to the extent of given number, as for example, 25 messages to carrier No. 1 or 75 messages to carrier No. 2.

In the conducting of a telegraph business it is often necessary to transmit supervisory notes such as queries and answers to certain messages and it is desired that these notes not enter into the determination of the established quota ratio. When a supervisory note is received in the tape 16 for switching to one of the two carriers, a button in the lower row of push buttons A–1 to E–1 is operated, and while such supervisory note messages are not registered on the quota ratio indicator, they are counted by a pair of counters 49 and 51, one for one carrier and the other for the carrier. Thus the sum of the numbers on the automatic message numbering machines of the sending positions serving one carrier, less the number recorded in its counter will give the actual number of messages switched to this carrier.

Let it be assumed that a supervisory message is stored in the tape and is destined for the destination indicated by the A–1 push button. The depression of this button grounds the No. 2 point on the lower level of the connector switch 17 and causes advancement of the wipers thereof to corresponding points and the operation of relays CSI, CSC, RSC and CIS2, as well as those of the transmitter circuit 13 in the manner set forth. This causes the supervisory note to be transmitted intraoffice to the indicated sending position. It will be noted the points on the eight upper levels of the connector switch 17 are strapped together in pairs so that the receiving position is connected to the same sending position when the switch stops in either one of two positions. For example, points 1 and 2 of switch 17 connect to sending position 18 and points 3 and 4 to sending position 19. The operation of relay CIS2 completes a circuit through the ninth level of switch 17 for the operation of relay 1NC, or carrier No. 1 Note Control relay. The operation of this relay opens the circuit of the normally operated slow-to-release relay NCS and through its inner tongue completes a circuit for the operation of counter 49. Thus when relay NCS releases, the counter 49 is advanced one digit to indicate the switching of one supervisory note to the No. 1 carrier. In a similar manner the operation of one of the B–1 to E–1 push buttons causes the wiper of the next to last level of the connector switch 17 to come to rest on either the 4th, 6th, 8th or 10th point, to complete a circuit for the operation of relay 2NC. The operation of this relay completes a circuit to counter 51 and thereby counts the number of supervisory notes switched to the No. 2 carrier. The connections to the counters 49 and 51 as well as those to the Subtract magnet 32 of the quota ratio indicator and the step magnet of rotary switch 43 are multiplied to the control equipment associated with other groups of push buttons and receiving positions, and such connections are indicated by the reference character M.

In the arrangement shown there is provision to prevent a series of messages being switched to a given destination in the event one of the push buttons A to E and A–1 to E–1 becomes stuck. If it is assumed that the A push button is depressed and remains in an actuated position, a message will be switched to the proper sending position and even though the push button remains actuated, relay CSI will release as relay 302 becomes deenergized when the intraoffice connection is established. The release of relay CSI in this case will establish a holding ground for relay 316 to prevent the release of this relay at the end of the message. With relay 316 held operated, the transmitter step pulse circuit, described in the above-mentioned patents, will not be completed and consequently the transmitter 12 will be prevented from advancing blanks in the tape which separate the transmitted message from the following one. The holding circuit for relay 316 is from a front contact and tongue thereof, a back contact and tongue of relay CSI, and the wiper of the lower level of connector switch 17 to ground through the stuck push button.

While the invention has been described and is shown in the drawings as maintaining a ratio of three to one between the two carriers or groups of sending positions to which messages are switched, it is obvious that the ratio can readily be changed. For example, by strapping every other one of the points of the rotary switch 43 to the circuit of the Add magnet 31, a ratio of one to two could be maintained. Also, by connecting the inner tongue of relay 2QC directly to the Add magnet 31, a one to one ratio could be maintained. In addition, the insertion of a rotary switch, such as 43 in the circuit to the Subtract magnet 32 with its every other point strapped together and with rotary switch 43 strapped in the manner shown, would maintain a ratio of two to three.

While the invention has been described in but its preferred form, it will be obvious that various modifications and changes may be made therein other than those suggested above without departing from the spirit or essential attributes thereof, and it is desired therefore that only such limitations be placed thereon as are specifically set forth in the appended claims.

What is claimed is:

1. In a telegraph switching system, a source of telegraph message signals, a plurality of groups of sending positions with some of said sending positions representing common destinations, a manually controlled switching device for selectively establishing transmission paths from said source to any one of said sending positions at a time for the transmission of a message thereto, a quota ratio indicator controlled by the number of messages sent to each group of sending positions, and means controlled by said quota ratio indicator for indicating the group of sending positions to which a message having a destination common to more than one of said groups should be transmitted to maintain a predetermined numerical ratio of switched messages between said groups of sending positions.

2. In a telegraph switching system, a source of telegraph message signals, a plurality of groups of sending positions with some of said sending positions representing common destinations, a switching device for selectively establishing transmission paths from said source to any one of said sending positions at a time for the transmission of a message thereto, a quota ratio indicator controlled by the number of messages transmitted to each group of sending positions to which a message having a destination common to more than one of said groups should be transmitted to maintain a predetermined numerical ratio of switched messages between said groups of sending positions, and means for preventing predetermined classes of messages transmitted to said sending positions from effecting said quota ratio indicator.

3. In a telegraph switching system, a source of telegraph message signals, a plurality of groups of sending positions, a switching device for selectively establishing transmission paths from said source to any one of said sending positions at a time for the switching of a message thereto, a quota ratio indicator controlled by the number of messages transmitted to each group of sending positions, means controlled by said quota ratio indicator for indicating the group of sending positions to which a message should be switched to maintain a predetermined numerical ratio of switched messages between said groups of sending positions, and means for preventing predetermined classes of messages switched to said sending positions from entering into the quota determination of said quota ratio indicator.

4. In a telegraph switching system, a source of telegraph message signals, a plurality of groups of sending circuits, a switching device for selectively establishing transmission paths from said source to any one of said sending circuits at a time for the switching of a message thereto, an indicator for each one of said groups of sending circuits, a quota ratio determining means controlled by the number of messages switched to said sending circuits, means controlled by said quota ratio determining means for operating said indicators to indicate the groups of sending circuits to which messages should be switched to maintain a predetermined numerical ratio of messages between said groups of sending positions, and means for preventing predetermined classes of messages switched to said sending positions from effecting said quota ratio determining means.

5. In a telegraph switching system, a source of telegraph message signals, a plurality of groups of sending circuits, a switching device for selectively establishing transmission paths from said source to any one of said sending positions at a time for the transmission of a message thereto, a quota ratio determining means controlled by the number of messages sent to each group of sending positions, a visual indicator for each one of said groups of sending circuits, and means controlled by said quota ratio determining means for operating one of said indicators at a time to indicate the group of sending circuits to which the next message from said source should be transmitted to maintain a predetermined numerical ratio of messages between said groups of sending circuits.

6. In combination in a telegraph switching system having a source of stored telegraph signals and a manually controlled switching device for selectively establishing transmission paths from said source to any one of a plurality of sending circuits at a time for the transmission of a message thereto, a quota ratio indicator controlled by the number of messages sent to each sending circuit, and means controlled by said quota ratio indicator for indicating the sending circuit to which a message from said source should be transmitted to maintain a predetermined numerical ratio of messages between said sending circuits.

7. In combination in a telegraph switching system including a plurality of telegraph message receiving positions and a plurality of groups of sending positions with manually controlled switching equipment for interconnecting any one of said receiving positions with any one of said sending positions, an indicator individual to each group of sending positions, means controlled by the number of messages sent to each group of sending positions for controlling said indicators to indicate the group of sending positions to which a message should be switched in order to maintain a predetermined numerical ratio of messages switched to said groups of sending positions and means to take into account in the ratio determination messages switched not in accordance with the operation of said indicators.

8. In combination in a telegraph switching system including a plurality of telegraph message receiving positions and a plurality of groups of sending positions with manually controlled switching equipment for interconnecting any one of said receiving positions with any one of said sending positions, an indicator individual to each group of sending positions, means controlled by the number of messages sent to each group of sending positions for controlling said indicators to indicate the groups of sending positions to which a message should be switched in order to maintain a predetermined numerical ratio of messages switched to said groups of sending positions, an alarm device, and means for operating said alarm device when the number of messages switched to a group of sending positions exceeds the predetermined numerical ratio by a predetermined number.

9. In combination in a telegraph switching system including a plurality of telegraph message receiving positions and a plurality of telegraph message receiving positions and a plurality of groups of sending positions with switching equipment for interconnecting any one of said receiving positions with any one of said sending positions, an indicator individual to each group of sending positions, means for controlling said indicators to indicate the group of sending positions to which a message should be switched in order to maintain a predetermined numerical ratio of messages switched to said groups of sending positions, a pair of manually operable elements assigned to each of said sending positions with either one of a pair operative to control said switching equipment to interconnect a receiving position to the associated sending position, means operative when a message is switched to a sending position on the operation of a predetermined one of a pair of said manually operable elements to account for the same in said indicator controlling means and means operative when a message is switched to a sending position on the operation of the other one of said pairs of manually operable elements to prevent the switching operation from registering in said indicator controlling means.

GEORGE G. LIGHT.
FRANK L. CURRIE.

References Cited in the file of this patent

UNITED STATES PATENTS

| Number | Name | Date |
|---|---|---|
| 1,739,935 | White | Dec. 17, 1929 |
| 2,248,820 | Haselton | July 8, 1941 |